Aug. 20, 1940.  G. B. WOOD  2,212,058
REFUSE HANDLING TRUCK BODY
Filed Aug. 23, 1938  4 Sheets-Sheet 2
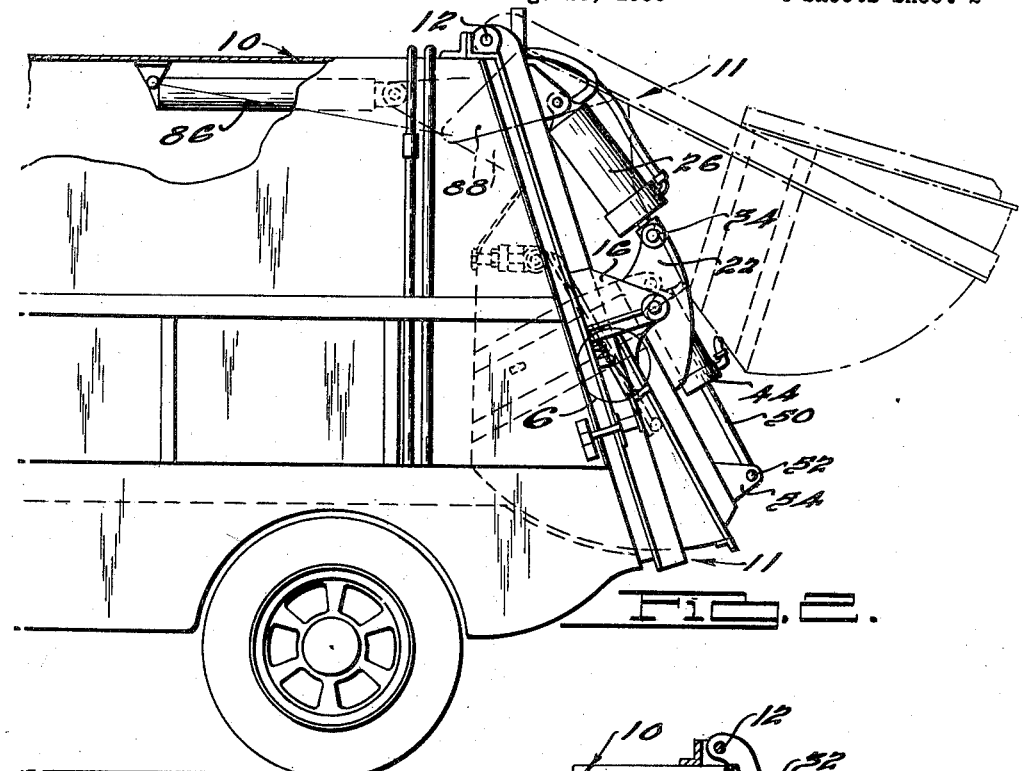
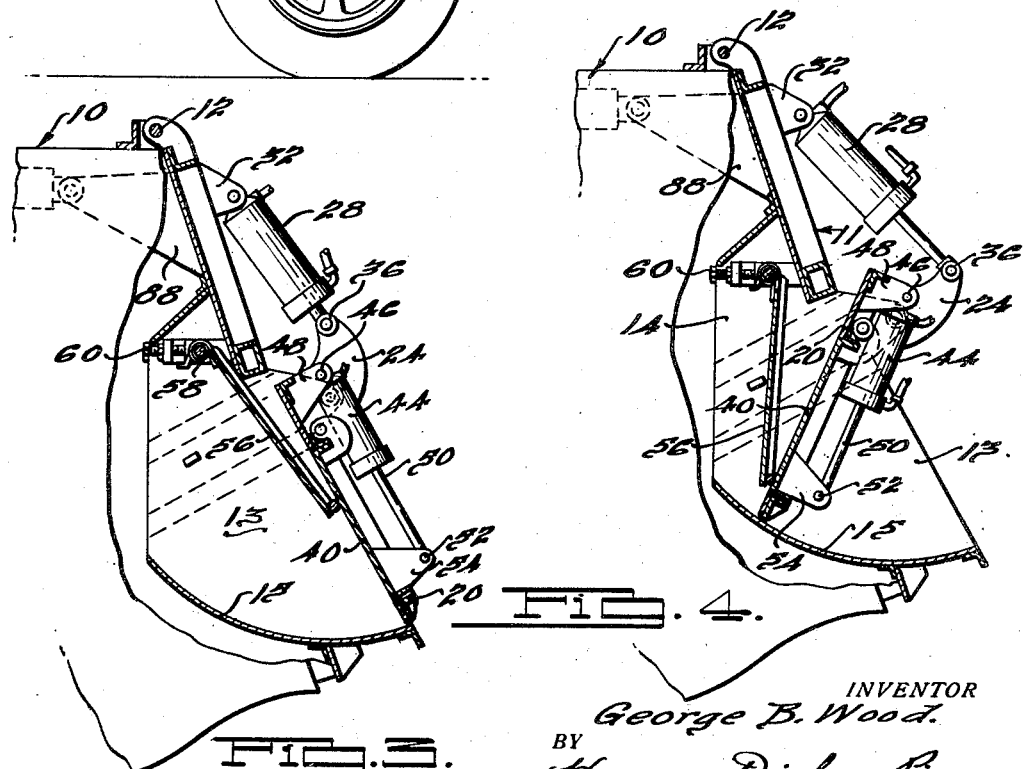
INVENTOR
George B. Wood.
BY Harness, Dickey & Pierce.
ATTORNEYS.

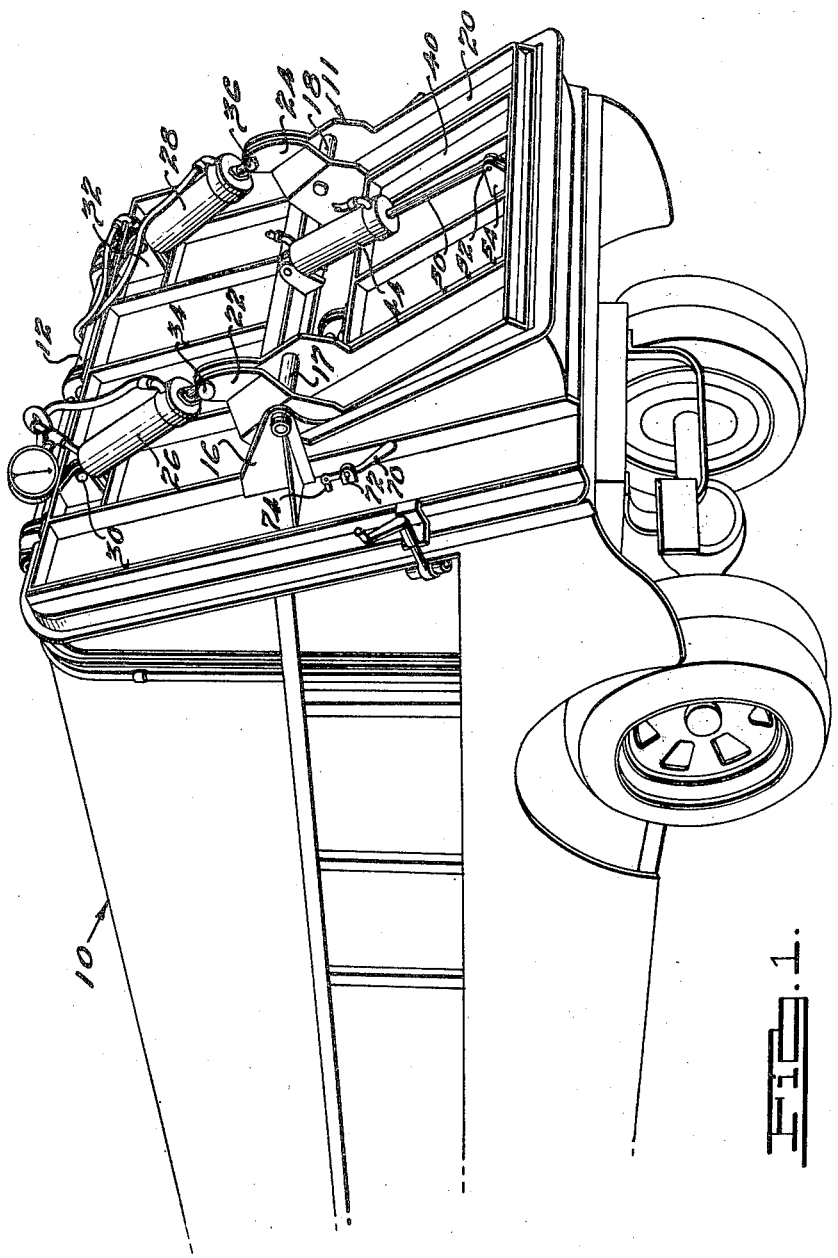

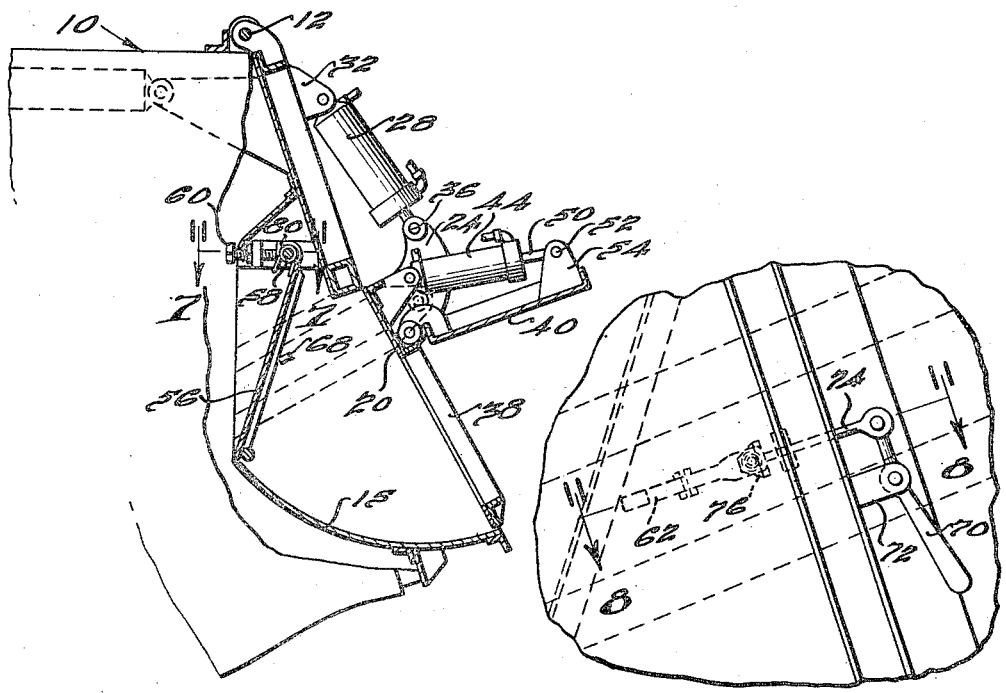
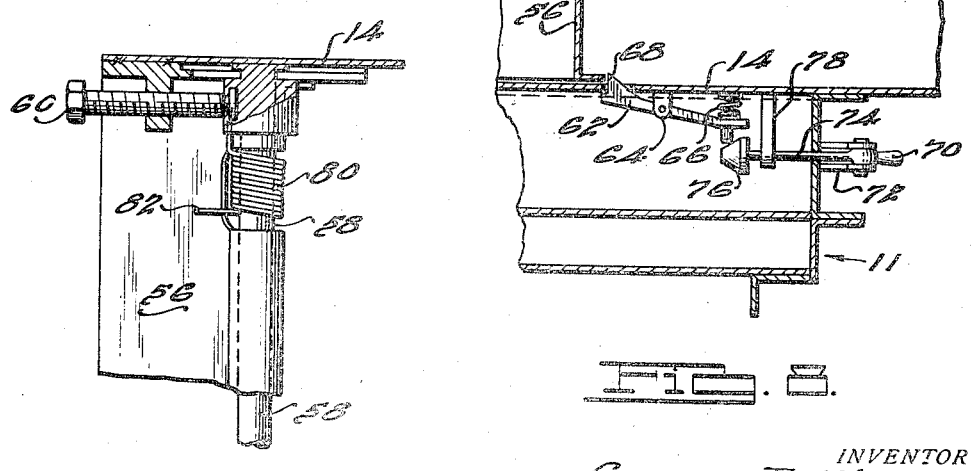

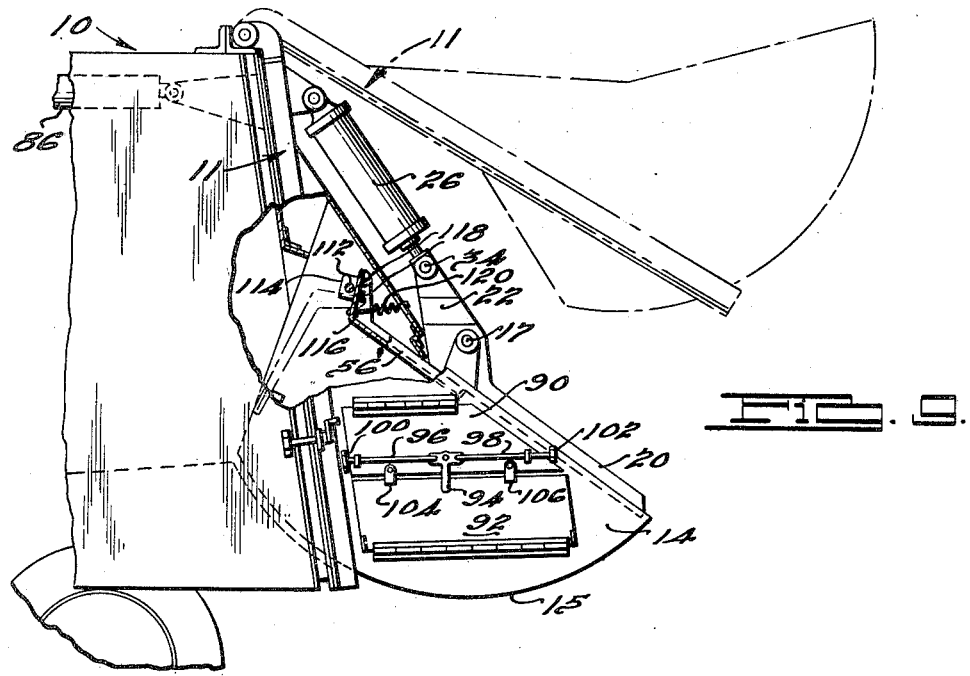
FIG. 9.
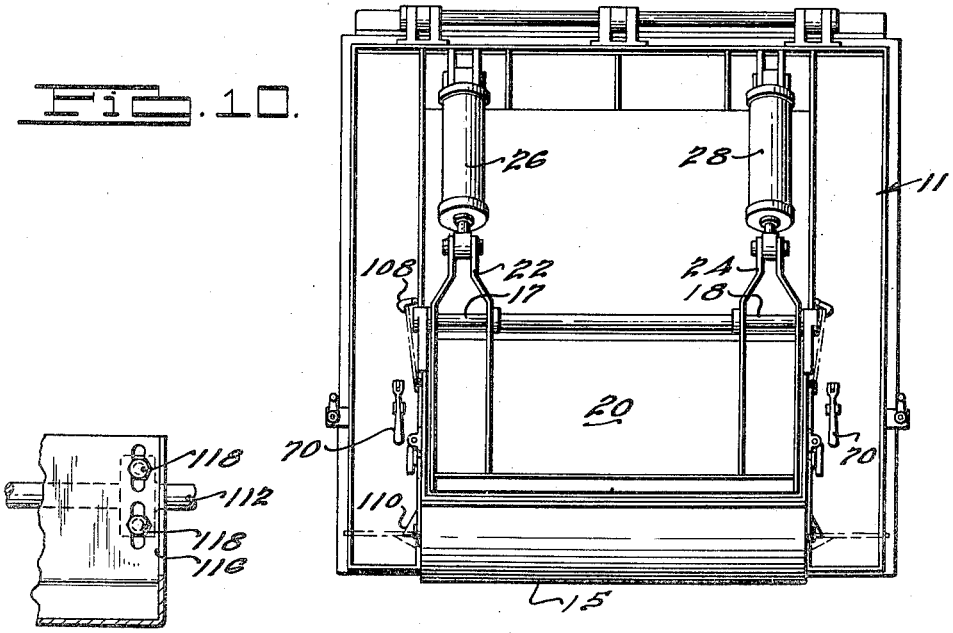
FIG. 10.
FIG. 11.
INVENTOR
George B. Wood.
BY Harness, Dickey & Pierce.
ATTORNEYS.

Patented Aug. 20, 1940

2,212,058

UNITED STATES PATENT OFFICE 2,212,058

REFUSE HANDLING TRUCK BODY

George B. Wood, Detroit, Mich., assignor to Gar Wood Industries, Inc., Detroit, Mich., a corporation of Michigan Application August 23, 1938, Serial No. 226,336

34 Claims. (Cl. 214—67)

This invention relates to refuse trucks.

The main objects of this invention are to provide a refuse truck in which the refuse may be packed into the truck under pressure and thereby very materially increase the carrying capacity of the truck body; to provide an apparatus of this character in which the refuse is pushed into the truck body and at the same time upwardly therein so as to pack the refuse tightly against the top of a relatively high truck body; to provide in an apparatus of this character, a combined packing and retaining member which has an adjustable pivotal mounting whereby the angular direction in which the refuse is packed may be varied at will; to provide a refuse truck body closure door of unitary character which may be readily applied to the rear end of many existing refuse truck bodies and which may be readily adapted to truck bodies of various designs and sizes.

An illustrative embodiment of this invention is shown in the accompanying drawings, in which:

Figure 1 is a fragmentary view in perspective of the rear end of a refuse truck body equipped with my improved invention;

Fig. 2 is a view in side elevation of the same and showing the closure door swung out to open position in dotted lines;

Fig. 3 is a view partly in elevation and partly in transverse section of the same and showing the packing and retaining panels immediately prior to operation for packing the refuse into the truck body;

Fig. 4 is a view of the same showing the packing panel swinging inwardly to pack the refuse into the truck body;

Fig. 5 is a view similar to Figs. 3 and 4 but showing the refuse retaining door in retaining position and with the loading panel open ready to have refuse placed in the chute;

Fig. 6 is an enlarged fragmentary view of that part of the mechanism enclosed within the circle marked "6" in Fig. 2;

Fig. 7 is an enlarged fragmentary sectional view taken on the line 7—7 of Fig. 5, looking in the direction indicated by the arrows;

Fig. 8 is an enlarged fragmentary sectional view taken along the line 8—8 of Fig. 6, looking in the direction indicated by the arrows;

Fig. 9 is a fragmentary view in side elevation of the rear end of a modified form adapted for having refuse filled from the side thereof;

Fig. 10 is a view in rear elevation of the structure shown in Fig. 9; and

Fig. 11 is an enlarged fragmentary detail view showing how the retaining panel is adjustably secured on its pivotal mounting.

Heretofore many attempts have been made to increase the load capacity of refuse truck bodies, and while some improvements along this line have been made, nevertheless the best that have been developed to date are a long way from what is desired. As is well known, refuse of this character is not particularly heavy when not packed under pressure, i. e., the material is of relatively light weight for its bulk. It is readily seen, therefore, that it is highly desirable to be able to load the body of a refuse truck with the refuse tightly packed therein so that a maximum load can be hauled each trip of the truck.

In the present invention, the truck body is provided with a rear closure door which has a relatively large rectangular opening therein and which is surrounded on its inner side with a refuse chute. A packer panel or door is pivotally mounted adjacent this opening and adapted to swing thereinto and forcibly push the refuse which has been dumped into the chute into the truck body. This swinging door or packing panel is itself provided with an opening therethrough which is provided with a closure panel or loading door through which the refuse is dumped into the chute.

An important feature of the present invention, however, is in the provision of a combined retaining door or panel and packing panel which is pivotally mounted on the inside of the main closure door, in such position as to swing within the chute over top of refuse dumped therein and contact with the inner side of the packing panel, so that when the packing panel is swung forwardly to push the refuse into the truck body, the retaining panel is engaged by the packing panel and in itself aids in pushing the refuse into the truck body. By adjusting the position of pivotal mounting of the retaining panel, the angularity of its face may be changed and thereby project the refuse into the body at various angles. On truck bodies of relatively long length or of considerable height, it is necessary that the refuse be pushed not only toward the front end of the body but upwardly at the same time so as to pack tightly against the roof of the body.

In the construction shown in the drawings, a truck body, generally designated 10, of the type used for the hauling of refuse, is shown provided with a unitary rear door closure, generally designated 11, which is swingably mounted on pivots 12 along its upper horizontal edge, the pivots 12 being carried by suitable brackets attached to the top rear end of the truck body 10. The closure door 11 is provided with a generally rectangular opening 13 in the lower part thereof which is surrounded by an inwardly extending chute having vertically, longitudinally extending side walls 14 and an arcuate bottom wall or floor 15.

The outer side of the door 11, adjacent the upper edge of the opening 13, is provided with a pair of spaced, parallel, outwardly extending brackets 16, one at each side of the opening 13, and which support a pair of axially aligned pivot pins 17 and 18 upon which is mounted a swinging pushing or packing panel 20. The outer side of the panel 20 is provided with spaced outwardly and upwardly extending lever arms 22 and 24 rigidly mounted thereon, through which the pivot pins 17 and 18 extend, and which thereby provide mountings for the packing panel 20. The panel 20 is swingable inwardly between the side wall 14 of the chute and the lower edge thereof is closely adjacent to the arcuate floor 15 of the chute, the arc of the chute floor being formed on a radius, the center of which is the axis of the pivot pins 17 and 18.

Means are provided for swinging the packing panel 20 inwardly under power and comprise a pair of hydraulic rams 26 and 28, the cylinders of which are pivoted to brackets 30 and 32, respectively, which are rigidly mounted on the outer side of the closure door 11 near the top thereof, and the piston rods of which are pivoted on pins 34 and 36 carried at the outer upper ends of the lever arms 22 and 24, respectively.

The pushing or packing panel 20 is also provided with a generally rectangular opening 38 therethrough, through which the refuse is filled or loaded into the chute. The opening 38 is closed by a door panel 40 which is pivotally mounted on pins 42 carried by the packing panel 20 closely adjacent the horizontal top edge of the opening 38 and which is adapted to swing rearwardly and upwardly as shown in Fig. 5 of the drawings. Means are provided for swinging the door 40 open and closed and comprise a hydraulic ram 44, the cylinder of which is pivoted at 46 to an outstanding bracket 48 mounted on the packing panel 20 and the piston rod 50 of which is pivoted at 52 to a bracket 54 mounted on the door 40 closely adjacent the lower edge thereof.

Means are provided for retaining the refuse within the truck body and comprise a combined retaining and packing panel 56 pivotally mounted along its upper horizontal edge at 58 between the side walls 14 of the chute within the truck body and positioned so that the lower free edge thereof may be engaged by the packing panel 20 for swinging the retaining panel inwardly when the packing panel is actuated to pack the refuse into the truck body.

The pivotal mounting 58 of the retaining panel 56 is adjustably positioned by means of set screws 60 so as to vary the location of the pivotal mounting thereof and thereby vary the angularity of the face of the panel 56 when it is swung inwardly by contact with the packing panel 20.

Means are provided for releasably retaining the panel 56 in its refuse retaining position, as shown in Fig. 5, and comprise a latch 62 movably mounted to a side wall 14 of the chute.

The latch 62 is pivotally mounted on a bracket 64 secured to the outer side of a chute side wall 14 and is yieldingly urged by a spring 66 to protect an end 68 thereof through a slot in the chute side wall in position to engage behind the edge of the retaining panel 56. Manually operable means are provided for releasing the latch 62 from engagement with the panel 56 and comprise a hand lever 70 pivotally mounted on a stationary bracket 72 secured to the outer side of the door 11. One end of the lever 70 is pivotally connected to one end of an axially slidable push rod 74, which passes through an aperture in the closure door 11. The other end of the push rod 74 is provided with a tapered head 76 positioned so as to engage the rear end of the latch 62 and force the same inwardly against the action of the spring 66 when the push rod 74 is projected axially inwardly by an outward pull on the handle 70. The inner end of the rod 74 is slidably supported in a bracket 78 mounted on the outer side of the chute side wall 14.

Means are provided for yieldingly urging or swinging the retaining panel 56 rearwardly so that its lower rear edge abuts against the inner side of the packing panel 20 and comprise helical torsion springs 80, one end of each of which is anchored in the side mounting brackets of the pivot pin 58 and the other end of which, as shown at 82, bears against the inner side of the panel 56.

In the use and operation of this device, the screws 60 are adjusted so as to position the pivotal mounting of the retaining door 58 in accordance with the height and length of the refuse truck body so that the inner face of the panel 56 is disposed at a proper angle to project the refuse toward the front of the truck body and at the same time upwardly against the roof thereof. With the retaining panel 56 releasably latched in the position shown in Fig. 5 of the drawings, the filler door 40 is swung to the position shown in full lines thereof, i. e., to an open position, at which time refuse is dumped through the opening 38 into the chute on the arcuate floor 15 thereof.

When a suitable amount of refuse has been dumped through the opening 38 into the chute, the filler door 40 is powered down to a closed position by the hydraulic ram 44. It is of particular advantage to have power mechanism for closing the filler opening door so as to cram loose materials therein, such as cardboard boxes and the like. When the filler door 40 has been closed, the manually operable handle 70 is actuated to release the latch 62 so that its inner engaging end 68 will release the retaining panel 56 and permit the helical torsion springs 80 to swing the panel rearwardly to the position shown in Fig. 3 of the drawings, the arrangement being such that the lower edge of the retaining panel 56 will swing over top of the refuse which has been put into the chute.

Fluid under pressure is then passed to the hydraulic rams 26 and 28, which, through the medium of the lever arms 22 and 24, will swing the packing panel 20 inwardly as shown in Fig. 4 of the drawings. During this inward swinging of the packing panel 20, the lower edge of the retaining panel 56 will slide down the inner face of the packing panel 20 and scrape off any refuse which may be clinging thereto, while at the same time causing the lower edge of the retaining panel 20 to slide down behind the refuse which is being pushed up by the packing panel. When the packing panel 20 has been swung to its innermost position, the retaining panel 56 will have passed the inner protruding end 68 of the spring pressed latch 62, and thereby be releasably secured in refuse retaining position as shown in Fig. 5 of the drawings, at which time the motion of the hydraulic rams 26 and 28 may be reversed to bring the packing panel back to its normal initial position.

It will be understood, of course, that the side marginal edges and the lower marginal edge of the packing panel 20 make a relatively snug or close fit with the side walls and bottom wall, respectively, of the chute, so that the refuse which has been dumped into the chute is scraped thereout and packed into the truck body.

When the body 10 has been tightly packed and loaded with refuse and hauled to a dumping ground, the entire rear closure door unit 11 is swung outwardly and upwardly on its pivotal mounting 12 by means of hydraulic rams 86 mounted on the inside of the truck body adjacent the top thereof and connected to inwardly extending brackets 88 which are rigidly secured to the inner side of the door 11 adjacent the top marginal edge thereof. The front end of the truck body 10 is then raised upwardly after the usual manner of dump trucks of this character by means of hydraulic rams or other suitable mechanism, not shown. Inasmuch as the door 11, being raised on its pivot, uncovers or opens the entire rear end of the truck body 10, the refuse therein will readily be unloaded by gravity.

In the modified form of the invention shown in Figs. 9, 10, and 11 of the drawings, the side walls 14 of the refuse receiving chute extend a substantial distance rearwardly from the rear closure door 11 and are provided with doors 90 and 92, respectively, which are hinged to the two side walls at their upper and lower edges, respectively. The door 90 is provided with a pivotally mounted T handle 94 to which is pivotally attached a pair of oppositely extending rods 96 and 98 which pass through guide clips attached to the outer surface of the door and extend therebeyond to engage clips 100 and 102 which are mounted upon the side walls 14. The door 90 is also provided with a pair of depending clips 104 and 106 which overlap the upper marginal edge of the door 92 for holding the door 92 closed when the door 90 is closed and fastened in place.

The door 90 is adapted to swing outwardly and upwardly and be releasably held in open position by a gravity latch 108, as shown in Fig. 10 of the drawings, and the door 92 is adapted to swing outwardly and downwardly to a horizontal position, a bracket 110 being provided near its lower edge for abutting against the outer surface of the chute side wall and holding the door in horizontal position. By having the doors 90 and 92 located in the side wall of the chute and positioned adjacent the lower part thereof, a workman standing on a street curb may readily load refuse into the chute through the side opening doors.

In the modified form, the combined packing and retaining panel 56' is pivotally mounted upon a stationary pivot 112 which may be in the form of a horizontally extending rod extending from one chute wall to the other. Bearing members 114 are pivotally mounted upon the rod 112 and the door 56 is provided with laterally extending flanged bracket members 116 integrally formed thereon, the flanges of which are slotted longitudinally to receive cap screws 118 by which the door may be adjustably positioned to vary the angularity of the face thereof when being swung inwardly by actuation of the pusher door.

The operation of the modified form is substantially the same as that for the preferred form, except that the filler opening doors 90 and 92 are operated by hand and the refuse may be filled therethrough by a workman standing on a curb. After a suitable amount of refuse has been dumped into the chute, the doors 90 and 92 are closed and fluid under pressure admitted to the hydraulic rams 26 and 28 for swinging the packing panel inwardly and thereby sweeping the refuse out of the chute and into the truck body. As in the preferred embodiment, during this loading movement the combined packing and retaining panel 56 is actuated and, when swung to its innermost position, is releasably engaged back of the latch 62.

By having the loading doors in the side of the refuse chute, the size of the chute may be materially enlarged and the arcuate floor thereof may extend upwardly at the rear a considerable distance higher than in the forms shown in Figs. 1 to 8 of the drawings, without raising the point at which the receptacles of refuse must be raised in order to dump them into the chute. An important feature of a construction of this character is to have a low loading point so that the workmen will not have to raise the receptacles of refuse an undue height and thereby be subjected to excessive physical strain.

As shown in Fig. 9, the retaining panel 56' is yieldingly urged to swing rearwardly in contact with the packing panel 20, by a helical tension spring 120.

Although but two specific embodiments of this invention have been herein shown and described, it will be understood that numerous other details of the constructions shown may be altered or omitted without departing from the spirit of this invention as defined by the following claims.

What I claim is:

1. In a truck body for refuse and the like, a closure for the rear end of the body, said closure being adapted to be pivoted along its upper horizontal edge to the body, said closure having an opening therein, a packer panel for said opening swingably mounted on said closure, said packer panel having a filler opening therein and a closure panel for said filler opening.

2. In a refuse truck body, a panel pivotally mounted for reciprocating swinging movement to pack the refuse into the body, a combined packing and retaining panel pivoted adjacent said packing panel, said retaining panel being engaged and actuated by said packing panel during each reciprocating packing movement thereof.

3. In a refuse truck body, a panel pivotally mounted for reciprocating swinging movement to pack the refuse into the body, a combined packing and retaining panel pivoted adjacent said packing panel, said retaining panel being engaged and actuated by said packing panel during each reciprocating packing movement thereof, yielding means normally urging said retaining panel toward said packing panel and a releasable catch for holding said retaining panel in refuse retaining position.

4. In a refuse truck body, a panel pivoted adjacent its upper horizontal edge to said body for swinging movement to pack the refuse into the body, a combined packing and retaining panel pivoted within said body adjacent said packing panel, said retaining panel being engaged and actuated by said packing panel during its swinging movement, yielding means normally urging said retaining panel towards said packing panel, and means for adjustably positioning the pivotal mounting of said retaining panel.

5. In a refuse truck body, a panel pivoted adjacent its upper horizontal edge to said body for swinging movement to pack the refuse into the body, a combined packing and retaining panel pivoted within said body adjacent said packing panel, said retaining panel being engaged and actuated by said packing panel during its swinging movement, yielding means normally urging said retaining panel towards said packing panel, means for adjustably positioning the pivotal mounting of said retaining panel, and a releasable catch for holding said retaining panel in refuse retaining position.

6. A closure for a refuse truck body comprising a closure door for the rear end thereof, a chute mounted on said closure door, a packing panel swingably mounted on said door and swingable into said chute for packing refuse into the truck body, the bottom of said chute being arcuate and formed on a radius the center of which is the axis of pivotal mounting of said packing panel, the free swinging edge of said packing panel sweeping said arcuate chute floor, said packing panel having a filler opening therein, a swingable panel for said filler opening, and power means for swinging said packing panel.

7. A unitary structure for a refuse truck body comprising a closure door adapted to be pivoted to said body, said door having an opening therethrough, a refuse chute extending through said opening, a packer panel pivotally mounted on said door for swinging movement into said chute, an edge of said packing panel making a relatively close fit with a wall of said chute, said packing panel having a filler opening therein, a panel pivoted on said packing panel for closing said filler opening, and power means for swinging said packing panel to move refuse in said chute into said truck body.

8. A unitary structure for a refuse truck body comprising a closure door adapted to be pivoted to said body, said door having an opening therethrough, a refuse chute extending through said opening, a packer panel pivotally mounted on said door for swinging movement into said chute, the edges of said packing panel making a relatively close fit with the walls of said chute, said packing panel having a filler opening therein, a closure panel for said filler opening, power means for swinging said packing panel to move refuse in said chute into said truck body, and power means for moving said filler opening panel.

9. A unitary structure for a refuse truck body comprising a closure door adapted to be pivoted to said body, said door having an pening therethrough, a refuse chute communicating with said opening, a packer panel pivotally mounted on said door for swinging movement into said chute, an edge of said packing panel making a relatively close fit with a wall of said chute, said packing panel having a filler opening therein, a closure panel for said filler opening, power means for swinging said packing panel to move refuse in said chute into said truck body, a refuse retaining panel pivoted on the inner side of said closure door, yielding means normally urging said retaining panel toward and in contact with said packing panel, and a releasable catch for holding said retaining panel in refuse retaining position.

10. A unitary structure for a refuse truck body comprising a closure door adapted to be pivoted to said body, said door having an opening therethrough, a refuse chute communicating with said opening, a packer panel pivotally mounted on said door for swinging movement into said chute, an edge of said packing panel making a relatively close fit with a wall of said chute, said packing panel having a filler opening therein, a closure panel for said filler opening, power means for swinging said packing panel to move refuse in said chute into said truck body, power means for pivotally moving said filler opening panel, and a refuse retaining panel swingably mounted at the inner side of said closure door and within said chute.

11. A unitary structure for a refuse truck body comprising a closure door adapted to be pivoted to the body, said door having an opening therethrough, a refuse chute communicating with said opening, a packer panel pivotally mounted on said door for swinging movement into said chute, an edge of said packing panel making a relatively close fit with a wall of said chute, said packing panel having a filler opening therein, a panel pivoted on said packing panel for closing said filler opening, power means for swinging said packing panel to move refuse in said chute into the truck body, a refuse retaining panel swingably mounted at the inner side of said closure door and within said chute, yielding means normally urging said retaining panel toward said packing panel and releasable catch means for releasably holding said retaining panel in refuse retaining position.

12. A unitary structure for a refuse truck body comprising a closure door adapted to be pivoted to the body, said door having an opening therethrough, a refuse chute extending through said opening, a packer panel pivotally mounted on said door for swinging movement into said chute, an edge of said packing panel making a relatively close fit with a wall of said chute, said packing panel having a filler opening therein, a closure panel for said filler opening, power means for swinging said packing panel to move refuse in said chute into said truck body, a refuse retaining panel pivoted on the inner side of said closure door, yielding means normally urging said retaining panel toward and in contact with said packing panel so as to be actuated thereby, a releasable catch for holding said retaining panel in refuse retaining position, and manually operable means accessible from the outer side of said door for releasing said catch means.

13. In a refuse truck body, a panel pivoted to said body for reciprocating swinging movement to pack the refuse into the body, a combined packing and retaining panel pivoted adjacent said packing panel, said retaining panel being engaged and actuated by said packing panel during each of its packing movements to pack and retain refuse in said body, and hydraulic means for actuating said packing panel.

14. In a refuse truck body, a panel pivotally mounted for reciprocating swinging movement to pack the refuse into the body, a combined packing and retaining panel pivoted adjacent said packing panel, said retaining panel being engaged and actuated by said packing panel during each of its packing movements to pack and retain refuse in said body, yielding means normally urging said retaining panel toward said packing panel, a releasable catch for holding said retaining panel in refuse retaining position, and hydraulic means for actuating said packing panel.

15. In a refuse truck body, a panel pivoted adjacent its upper horizontal edge to said body for swinging movement to pack the refuse into the body, a combined packing and retaining panel pivoted within said body adjacent said packing panel, said retaining panel being engaged and actuated by said packing panel during its swinging movement, yielding means normally urging said retaining panel towards said packing panel, means for adjustably positioning the pivotal mounting of said retaining panel, and hydraulic means for actuating said packing panel.

16. In a refuse truck body, a panel pivoted adjacent its upper horizontal edge to said body for swinging movement to pack the refuse into the body, a combined packing and retaining panel pivoted within said body adjacent said packing panel, said retaining panel being engaged and actuated by said packing panel during its swinging movement, yielding means normally urging said retaining panel towards said packing panel, means for adjustably positioning the pivotal mounting of said retaining panel, a releasable catch for holding said retaining panel in refuse retaining position, and hydraulic means for actuating said packing panel.

17. A unitary closure door adapted to be pivotally attached to a refuse truck body, comprising a door closure adapted to be pivotally mounted, said door having an opening therethrough, a swingable panel pivotally mounted on the outer side of said door and swingable through said door opening for packing refuse into the truck body, a combined packing and retaining panel pivotally mounted on the inner side of said closure door in position to be and being engaged by said packing panel, and hydraulic means for swinging said packing panel.

18. In a refuse truck body having an opening therein, a swinging panel pivotally mounted to swing through said opening for packing refuse into the truck body, and a combined packing and retaining panel pivotally mounted on the inside of said truck body in position to be and being engaged and actuated by said packing panel during each of its packing movements to pack and retain refuse in said body, and hydraulic means for swinging said packing panel.

19. In a refuse truck body, a chute, a swingably mounted panel for moving refuse from said chute into the body, a side wall of said chute having a filler opening through which refuse may be placed in said chute, a panel movably mounted adjacent the inner end of said chute for retaining the refuse in the body, and means for swinging said refuse moving panel.

20. In a refuse truck body, a chute, a swingably mounted panel for moving refuse from said chute into the body, a side wall of said chute having a filler opening through which refuse may be placed in said chute, a panel movably mounted adjacent the inner end of said chute for retaining the refuse in the body, and hydraulic means for swinging said refuse moving panel.

21. In a refuse truck body, a chute, a swingably mounted panel for moving refuse from said chute into the body, a side wall of said chute having a filler opening through which refuse may be placed in said chute, a panel movably mounted adjacent the inner end of said chute for retaining the refuse in the body, said retaining panel being actuated by said refuse moving panel, and means for swinging said refuse moving panel.

22. In a refuse truck body, a chute, a swingably mounted panel for moving refuse from said chute into the body, a side wall of said chute having a filler opening through which refuse may be placed in said chute, a panel movably mounted adjacent the inner end of said chute for retaining the refuse in the body, said retaining panel being actuated by said refuse moving panel, and hydraulic power means for swinging said refuse moving panel.

23. In a refuse truck body, a unitary rear closure door, a chute mounted on said door, a swingably mounted panel for sliding within said chute and moving refuse from said chute into the body, a side wall of said chute having a filler opening through which refuse may be placed in said chute, a panel movably mounted adjacent the inner end of said chute for retaining the refuse in the body, said retaining panel being actuated by said refuse moving panel, and hydraulic power means for swinging said refuse moving panel.

24. In a refuse truck body, a panel pivotally mounted for reciprocating swinging movement to pack the refuse into the body, a combined packing and retaining panel pivoted adjacent said packing panel and positioned so as to be engaged and actuated by said packing panel during each of its packing movements, and means for adjusting the pivotal mounting of said retaining panel so as to adjust the plane of said retaining panel for varying its angularity with respect to the body.

25. In a refuse truck body, a panel pivoted adjacent its upper horizontal edge to said body for swinging movement to pack the refuse into the body, a combined packing and retaining panel pivoted within said body adjacent said packing panel and positioned so as to be engaged and actuated by said packing panel during its swinging movement, yielding means normally urging said retaining panel toward said packing panel, and means for adjustably positioning the plane of said retaining panel for varying its angularity with respect to the body.

26. In a refuse truck body, a panel pivoted to said body for reciprocating swinging movement to pack the refuse into the body, a combined packing and retaining panel pivoted adjacent said packing panel and positioned so as to be engaged and actuated by said packing panel during each of its packing movements, hydraulic means for actuating said packing panel, and means for adjusting the pivotal mounting of said retaining panel so as to adjust the plane of said retaining panel for varying its angularity with respect to the body.

27. In a refuse truck body, a chute, a reciprocably swingably mounted panel for moving refuse from said chute into the body, a filler door in a side wall of said chute through which refuse may be placed in said chute, a panel movably mounted adjacent the inner end of said chute for retaining the refuse in the body, means for swinging said refuse moving panel, and means for adjusting the pivotal mounting of said retaining panel so as to adjust the plane of said retaining panel for varying its angularity with respect to the body.

28. In a refuse truck body, a chute, a reciprocably swingably mounted panel for moving refuse from said chute into the body, a filler door in a side wall of said chute through which refuse may be placed in said chute, a panel movably mounted adjacent the inner end of said chute for retaining the refuse in the body, said retaining panel being actuated by said refuse moving panel, hydraulic power means for swinging said refuse moving panel, and means for adjusting the pivotal mounting of said retaining panel so as to adjust the plane of said retaining panel for varying its angularity with respect to the body.

29. In a refuse truck body, a panel pivotally mounted for reciprocating swinging movement to pack the refuse into the body, a combined packing and retaining panel pivoted adjacent said packing panel and positioned so as to be engaged and actuated by said packing panel during each of its packing movements to pack and retain refuse in said body, an edge of said retaining panel wiping the surface of said packing panel during its normal operating movement.

30. In a refuse truck body, a panel pivotally mounted adjacent its upper horizontal edge for swinging movement to pack the refuse into the body, a combined packing and retaining panel pivoted adjacent its upper horizontal edge and adjacent to said packing panel, said retaining panel being engaged and actuated by said packing panel during each of its packing movements to pack and retain refuse in said body, the lower horizontal edge of said retaining panel slidably engaging and wiping the face of said packing panel during the packing movement of said packing panel.

31. A closure for a refuse truck body comprising a closure door for the rear end thereof, a chute mounted on said closure door, a packing panel swingably mounted on said door and swingable into said chute for packing refuse into the truck body, the floor of said chute being arcuate and formed on a radius, the center of which is the axis of pivotal mounting of said packing panel, the free swinging edge of said packing panel sweeping said arcuate chute floor, said packing panel having a filler opening therein, a closure panel for said filler opening, and power means for swinging said packing panel.

32. A unitary structure for a refuse truck body comprising a closure door adapted to be pivoted to said body, said door having an opening therethrough, a refuse chute extending through said opening, a packer panel pivotally mounted on said door for swinging movement into said chute, an edge of said packing panel making a relatively close fit with a wall of said chute, said packing panel having a filler opening therein, a movable closure for said filler opening and power means for swinging said packing panel to move refuse in said chute into said truck body.

33. In a refuse truck body, a unitary rear closure door, a chute mounted on said door, a swingably mounted panel for sliding within said chute and moving refuse from said chute into the body, a filler door in a side wall of said chute through which refuse may be placed in said chute, a panel movably mounted adjacent the inner end of said chute for retaining the refuse in the body, said retaining panel being actuated by said refuse moving panel, and means for swinging said refuse moving panel.

34. In a refuse truck body, a unitary rear closure door, a chute mounted on said door, a swingably mounted panel for sliding within said chute and moving refuse from said chute into the body, a side wall of said chute having a filler opening through which refuse may be placed in said chute, a panel movably mounted adjacent the inner end of said chute for retaining the refuse in the body, the lower edge of said retaining panel slidably engaging the face of said refuse moving panel and having a wiping action thereover, and means for swinging said refuse moving panel.

GEORGE B. WOOD.